3,060,234
NOVEL DIKETOTRIAZABORINANES
James L. Boone, Fullerton, Calif., assignor to United States Borax & Chemical Corporation, Los Angeles, Calif., a corporation of Nevada
No Drawing. Filed Feb. 1, 1962, Ser. No. 170,514
8 Claims. (Cl. 260—551)

The present invention relates as indicated to new heterocyclic organoboron compounds and has more particular reference to diketotriazaborinanes and means for preparing the same.

It is, therefore, the principal object of the present invention to provide as new compositions of matter the diketotriazaborinanes.

It is a further object of this invention to provide methods for preparing the diketotriazaborinanes.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises diketotriazaborinanes having the formula:

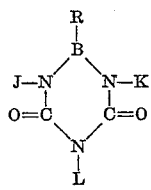

where R is a radical selected from the group consisting of alkyls of from 1 to 5 carbon atoms, phenyl, m-substituted phenyl and p-substituted phenyl said substituents selected from the group consisting of methyl, methoxy and chloro radicals, J is selected from the group consisting of hydrogen and alkyl radicals of from 1 to 5 carbon atoms, L is selected from the group consisting of hydrogen, alkyl radicals of from 1 to 5 carbon atoms, phenyl, m-substituted phenyl and p-substituted phenyl said substituents selected from the group consisting of methyl, methoxy and chloro radicals, when J is hydrogen K is selected from the group consisting of hydrogen, alkyl radicals of from 1 to 5 carbon atoms, phenyl, m-substituted phenyl and p-substituted phenyl said substituents selected from the group consisting of methyl, methoxy, and chloro radicals and when J is an alkyl radical of from 1 to 5 carbon atoms then K is selected from the group consisting of hydrogen and alkyl radicals of from 1 to 5 carbon atoms.

The present diketotriazaborinanes have numerous applications in organic syntheses and polymer formation. These materials also function as epoxy resin curing agents and fungicides, and when added to various polymerization reaction mixtures they increase the degree of thermal stability of the finished polymeric material. When used alone, the present compounds have been found to be effective herbicides, and in addition have a synergistic effect when included in many existing herbicidal compositions.

The preparation of the diketotriazaborinanes of the present invention can best be illustrated by the following equations:

(1)
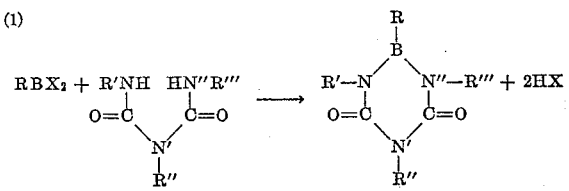

(2)
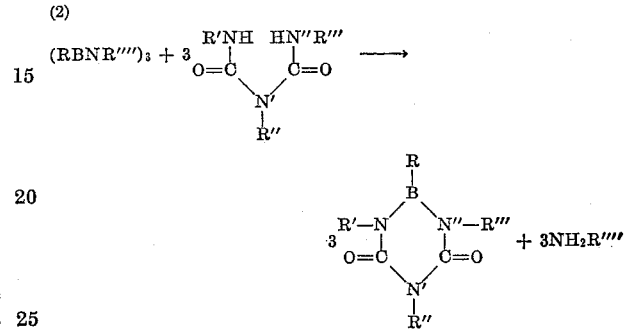

(3)
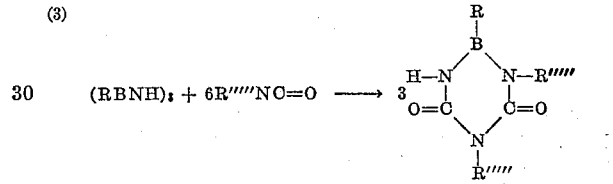

where X is either a thioalkyl said alkyl having from 1 to 5 carbon atoms, thiophenyl, diphenylamino, or a dialkylamino radical said alkyl having from 1 to 5 carbon atoms, R and R''''' are either alkyls of from 1 to 5 carbon atoms, phenyl or m- or p-substituted phenyl where the substituents are methyl, methoxy or chloro, R' and R''' are either hydrogen or alkyls of from 1 to 5 carbon atoms and R'' and R'''' are either hydrogen, alkyls of from 1 to 5 carbon atoms, phenyl or m- or p-substituted phenyl where the substituents are either methyl, methoxy or chloro.

As can be seen from the foregoing equations the present diketotriazaborinanes are prepared by reacting either a thioboronate, a bis(diorganoamino)borane, or a B-triorganoborazole with a biuret, or by reacting a B-triorganoborazole with an organoisocyanate.

The preferred method for effecting the present reactions is a direct single-step process. The reactants are combined in the presence or absence of a reaction solvent, such as dimethyl formamide, and the resultant reaction mixture is heated under reflux in an inert atmosphere. The most volatile reaction product is removed by distillation, and the desired product is recovered from the residual reaction mass by any of the well-known separation techniques, such as crystallization, distillation, sublimation, etc.

The present reactions will proceed regardless of the stoichiometry of the reactants present, however, in many instances the reactions proceed to completion more rapidly, and the yield of product is greater when an excess of the boron containing reactant is present. Therefore, in the preferred embodiment of the invention I use from about the stoichiometric amount to about twice the stoichiometric amount of the boron containing reactant required for the complete reaction.

The boron containing reactants applicable to the present process for preparing the diketotriazaborinanes are all known in the art. The following list is illustrative of these compounds:

Dimethyl phenylthioboronate
Di-n-propyl methylthioboronate
Di-n-propyl ethylthioboronate
Di-n-butyl methylthioboronate
Diphenyl propylthioboronate
Diphenyl isobutylthioboronate
Dimethyl-p-tolylthioboronate
Bis(dimethylamino)-p-chlorophenylborane
Bis(dimethylamino)phenylborane
Bis(dimethylamino)-m-tolylborane
Bis(diisopropylamino)phenylborane
Bis(diethylamino)-n-butylborane
Dianilino(methyl)borane
Bis(di-n-butylamino)isoamylborane
B-trimethylborazole
B-triethylborazole
B-triisopropylborazole
B-tri-n-butylborazole
B-triisoamylborazole
B-tri-p-anisylborazole
B-triphenylborazole
Hexamethylborazole
B-triphenyl-N-trimethylborazole The second group of reactants applicable to the present invention are the biurets having the formula

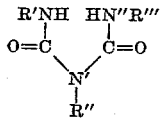

where R′ and R′′′ are either hydrogen or alkyls of from 1 to 5 carbon atoms and R″ is either hydrogen, alkyls of from 1 to 5 carbon atoms, phenyl, or m- or p-substituted phenyl where the substituents are either methyl, methoxy or chloro. Many of the biurets are commercially available, and those which are not, can be prepared by reacting an isocyanate with a urea.

The following list is illustrative of the applicable biurets:

Biuret
N,N′,N″-trimethyl biuret
N,N′,N″-tri-n-propyl biuret
N,N′,N″-tri-n-butyl biuret
N-methyl-N′,N″-diethyl biuret
N-n-amyl-N′,N″-diisopropyl biuret
N,N′-diethyl biuret
N-methyl-N′-tolyl biuret
N-methyl-N′-phenyl biuret
N′-phenyl biuret
N-methyl-N′-n-propyl-N″-ethyl biuret
N-ethyl-N′-n-butyl-N″-isoamyl biuret
N-ethyl-N′-phenyl-N″-isopropyl biuret The following list is illustrative of the isocyanates which when reacted with a B-triorganoborazole will result in the formation of diketotriazaborinanes:

Methyl isocyanate
Ethyl isocyanate
n-Propyl isocyanate
Isopropyl isocyanate
n-Butyl isocyanate n-Amyl isocyanate
Isoamyl isocyanate
Phenyl isocyanate
p-Tolyl isocyanate
m-Chlorophenyl isocyanate It is to be clearly understood that the foregoing lists of compounds are only a partial enumeration of the reactants applicable to the present invention and are not intended to limit the invention.

So that the present invention can be more clearly understood, the following examples are given for illustrative purposes:

I

B-trimethylborazole, 5.49 grams (0.0448 mole), twice the stoichiometric amount required, and 13.30 grams (0.1342 mole) of n-butyl isocyanate were added to a 100 ml. round-bottomed flask in a dry nitrogen atmosphere. The reaction mixture was heated under reflux for about 30 hours, and was fractionally distilled to yield 3.11 grams, 56.5% of the borazole reactant, 4.34 grams, 32.6% of the isocyanate reactant and a liquid pot residue. The residue was then distilled through a short path Vigreaux column, and a clear viscous oil which slowly crystallized to 9.73 grams (70.15% yield) of 2-methyl-3,5-di-n-butyl-4,6-diketo - 1,3,5,2-triazaborinane was obtained. Chemical analysis of the solid product yielded the following data:

|  | Calculated for $C_{11}H_{22}BN_3O_2$ | Found in product |
| --- | --- | --- |
| C, percent | 55.24 | 56.02 |
| H, percent | 9.27 | 9.34 |
| B, percent | 4.52 | 4.58 |
| N, percent | 17.58 | 18.48 |
| Mol. Wt | 239.14 | 238.6 |

II

B-trimethylborazole, 5.66 grams (0.0462 mole), twice the required stoichiometric amount, and 16.50 grams (0.1381 mole) of phenyl isocyanate were added to a 100 ml. round-bottomed flask in a nitrogen atmosphere. The reaction mixture was heated under reflux for about 30 hours, and was then fractionally distilled to yield 2.02 grams (35.7%) of the borazole reactant and a clear solid residue. The residue was recrystallized from diethyl ether to yield 14.97 grams of 2-methyl-3,5-diphenyl-4,6-diketo-1,3,5,2-triazaborinane (60.22% yield). Chemical analysis of the solid product yielded the following data:

|  | Calculated for $C_{15}H_{14}BN_3O_2$ | Found in product |
| --- | --- | --- |
| C, percent | 64.55 | 64.96 |
| H, percent | 5.06 | 5.66 |
| B, percent | 3.88 | 4.09 |
| N, percent | 15.06 | 14.01 |
| Mol. Wt | 279.12 | 277.5 |

III

B-trimethylborazole, 2.73 grams (0.0223 mole) and 6.90 grams (0.0669 mole) of biuret were added to 50 ml. of dimethyl formamide in a 200 ml. round-bottomed flask. The reaction mixture was heated under reflux for about 40 hours with a constant flow of dry nitrogen passing through the flask. During this interval the theoretical amount, 1.14 grams, of ammonia was removed. The hot reaction mass was then filtered, and on cooling the filtrate to about −20° C., 4.96 grams (58.42% yield) of 2-methyl-4,6-diketo-1,3,5,2-triazaborinane crystallized from the solution. Chemical analysis of the solid product yielded the following data:

|  | Calculated for $C_3H_6BN_3O_2$ | Found in product |
| --- | --- | --- |
| C, percent | 28.38 | 28.68 |
| H, percent | 4.76 | 4.57 |
| B, percent | 8.52 | 8.43 |
| N, percent | 33.11 | 33.70 |

IV

Bis(dimethylamino)phenylborane, 4.66 grams (0.0265 mole) and 2.73 grams (0.0265 mole) of biuret were added to a 200 ml. round-bottomed flask and heated for 5.5 hours at 100–140° C. The dimethylamine which was evolved (0.0383 mole, 72.2% of theory) was swept into standardized hydrogen chloride solution by a slow stream of dried nitrogen. Part of the impurities were sublimed from the solid product during 8 hours at 100–200° C., (0.05 mm.). The remaining impurities were removed by Soxhlet extraction with benzene for 24 hours and by extraction with a diethyl ether-benzene mixture for another 24 hours. The insoluble 2-phenyl-4,6-diketo-1,3,5,2-triazaborinane was then dried under high vacuum at room temperature (2.91 grams, 58.1% yield). The material appeared to melt with decomposition at 328° C. Chemical analysis of the product yielded the following data:

|  | Calculated for $C_8H_8BN_3O_2$ | Found in product |
| --- | --- | --- |
| C, percent | 50.84 | 49.85 |
| H, percent | 4.27 | 4.68 |
| B, percent | 5.73 | 5.99 |
| N, percent | 22.24 | 22.43 |

V

Di-n-propyl methylthioboronate, 6.32 grams (0.0359 mole) and 5.71 grams (0.0359 mole) of N,N'-diethyl biuret were added to 50 ml. of dimethyl formamide in a 200 ml. round-bottomed flask. The reaction mixture was then heated under reflux for about 18 hours with a constant flow of dry nitrogen passing through the flask. During this interval 97.5% of the theoretical amount, 5.30 grams, of n-propyl mercaptan was removed. The hot reaction mass was then filtered, and on cooling the filtrate, 4.44 grams (67.62% yield) of 2-methyl-3,5-diethyl-4,6-diketo-1,3,5,2-triazaborinane crystallized from the solution. Chemical analysis of the solid product yielded the following data:

|  | Calculated for $C_7H_{14}BN_3O_2$ | Found in product |
| --- | --- | --- |
| C, percent | 45.94 | 46.31 |
| H, percent | 7.71 | 7.62 |
| B, percent | 5.91 | 5.98 |
| N, percent | 22.96 | 23.10 |
| Mol. Wt | 183.03 | 178.6 |

VI

Bis(dimethylamino)-m-tolylborane, 7.48 grams (0.0394 mole), and N'-phenyl biuret, 7.06 grams (0.0394 mole) were added to 25 ml. of 1-methyl-2-pyrrolidinone and heated for 10 hours at 150° C. During this interval 2.49 grams of dimethylamine (70.1% of theory) was removed by a slow stream of dry nitrogen. The solvent was removed by distillation at reduced pressure and the product was recrystallized from toluene to give 5.76 grams of 2-m-tolyl-5-phenyl-4,6-diketo-1,3,5,2-triazaborinane (52.3% of theory). Chemical analysis of the product yielded the following data:

|  | Calculated for $C_{15}H_{14}BN_3O_2$ | Found in product |
| --- | --- | --- |
| C, percent | 64.55 | 63.98 |
| H, percent | 5.06 | 5.25 |
| B, percent | 3.88 | 3.96 |
| N, percent | 15.06 | 14.54 |
| Mol. Wt | 279.11 | 271.5 |

VII

B-tri-p-anisylborazole, 10.58 grams (0.0265 mole), and m-chlorophenyl isocyanate, 12.20 grams (0.0795 mole), were mixed and heated at reflux temperature for 24 hours under a dry nitrogen atmosphere. The product, 2-p-anisyl-3,5-di-m-chlorophenyl-4,6-diketo-1,3,5,2-triazaborinane, was separated from the excess borazole and other impurities by fractional crystallization from toluene (10.81 grams, 61.5% of theory). Chemical analysis of the product yielded the following data:

|  | Calculated for $C_{21}H_{16}BN_3O_3Cl_2$ | Found in product |
| --- | --- | --- |
| C, percent | 57.31 | 57.90 |
| H, percent | 3.66 | 3.84 |
| B, percent | 2.46 | 2.51 |
| N, percent | 9.55 | 9.03 |
| Cl, percent | 16.11 | 15.82 |
| Mol. Wt | 440.11 | 428.5 |

Other modes of applying the principle of the invention may be employed, change being made as regards the details described, provided the features as stated in any of the following claims or the equivalent of such be employed.

I, therefore, particularly point out and distinctly claim as my invention:

1. Diketotriazaborinanes of the formula $$\begin{array}{c} R \\ | \\ B \\ J-N \diagup \diagdown N-K \\ O=C \diagdown \diagup C=O \\ N \\ | \\ L \end{array}$$

where R is selected from the group consisting of alkyl of from 1 to 5 carbon atoms, phenyl, m-substituted phenyl and p-substituted phenyl, said substituents selected from the group consisting of methyl, methoxy and chloro, J is selected from the group consisting of hydrogen and alkyl of from 1 to 5 carbon atoms, L is selected from the group consisting of hydrogen, alkyl of from 1 to 5 carbon atoms, phenyl, m-substituted phenyl and p-substituted phenyl, said substituents selected from the group consisting of methyl, methoxy and chloro radicals, where J is hydrogen, K is selected from the group consisting of hydrogen, alkyl of from 1 to 5 carbon atoms, phenyl, m-substituted phenyl and p-substituted phenyl, said substituents selected from the group consisting of methyl, methoxy and chloro and where J is an alkyl of from 1 to 5 carbon atoms then K is selected from the group consisting of hydrogen and alkyl of from 1 to 5 carbon atoms.

2. 2-methyl-3,5-di-n-butyl-4,6-diketo-1,3,5,2-triazaborinane.

3. 2-methyl-3,5-diphenyl-4,6-diketo-1,3,5,2-triazaborinane.

4. 2-phenyl-4,6-diketo-1,3,5,2-triazaborinane.

5. 2-methyl-3,5-diethyl-4,6-diketo-1,3,5,2-triazaborinane.

6. 2-m-tolyl-5-phenyl-4,6-diketo-1,3,5,2-triazaborinane.

7. The method for preparing diketotriazaborinanes of the formula $$\begin{array}{c} R \\ | \\ B \\ R'-N \diagup \diagdown N-R''' \\ O=C \diagdown \diagup C=O \\ N \\ | \\ R'' \end{array}$$

which comprises heating under reflux a biuret having the formula

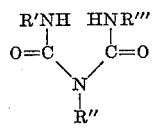

with a material selected from the group consisting of thioboronates and bis(diorganoamino)boranes having the formula $RBX_2$ and B-triorganoborazoles having the formula (RBNR'''')₃; removing the most volatile reaction product by distillation and recovering the desired diketotriazaborinane from the residual mass, where X is selected from the group consisting of thioalkyl said alkyl group having from 1 to 5 carbon atoms, thiophenyl, diphenylamino and dialkylamino, said alkyl group having from 1 to 5 carbon atoms, R is selected from the group consisting of alkyl of from 1 to 5 carbon atoms, phenyl, m-substituted phenyl and p-substituted phenyl, said substituents selected from the group consisting of methyl, methoxy and chloro, R' and R''' are selected from the group consisting of hydrogen and alkyl of from 1 to 5 carbon atoms, and R'' and R'''' are selected from the group consisting of hydrogen, alkyl of from 1 to 5 carbon atoms, phenyl, m-substituted phenyl and p-substituted phenyl, said substituents selected from the group consisting of methyl, methoxy and chloro.

8. The method for preparing diketotriazaborinanes of the formula

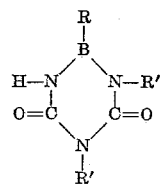

which comprises heating under reflux an organoisocyanate having the formula R'NCO with a B-triorganoborazole having the formula (RBNH)₃, and recovering the desired diketotriazaborinane, where R and R' are selected from the group consisting of alkyl of from 1 to 5 carbon atoms, phenyl, m-substituted phenyl and p-substituted phenyl, said substituents selected from the group consisting of methyl, methoxy and chloro.

No references cited.